Jan. 4, 1966  H. E. FRANKENBERG  3,227,308
FOOD CONTAINER FOR USE IN SPACE SHIPS
Filed Nov. 6, 1962  2 Sheets-Sheet 1

INVENTOR
HENRY E. FRANKENBERG
BY Mason, Porter, Diller & Stewart
ATTORNEYS

Jan. 4, 1966 H. E. FRANKENBERG 3,227,308
FOOD CONTAINER FOR USE IN SPACE SHIPS
Filed Nov. 6, 1962
2 Sheets-Sheet 2
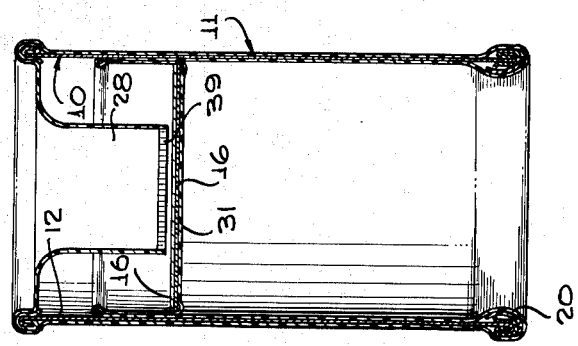
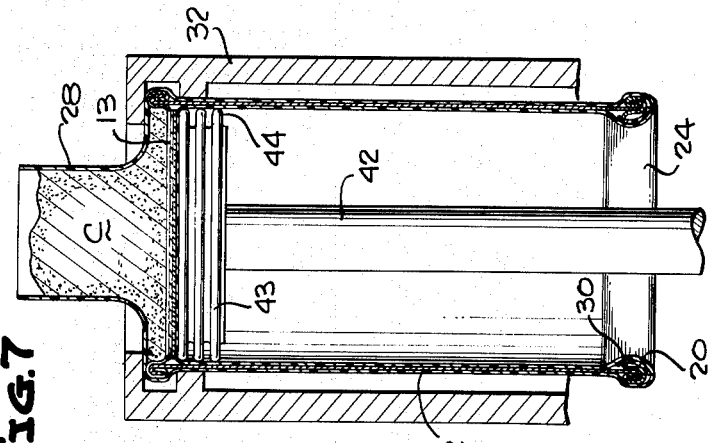
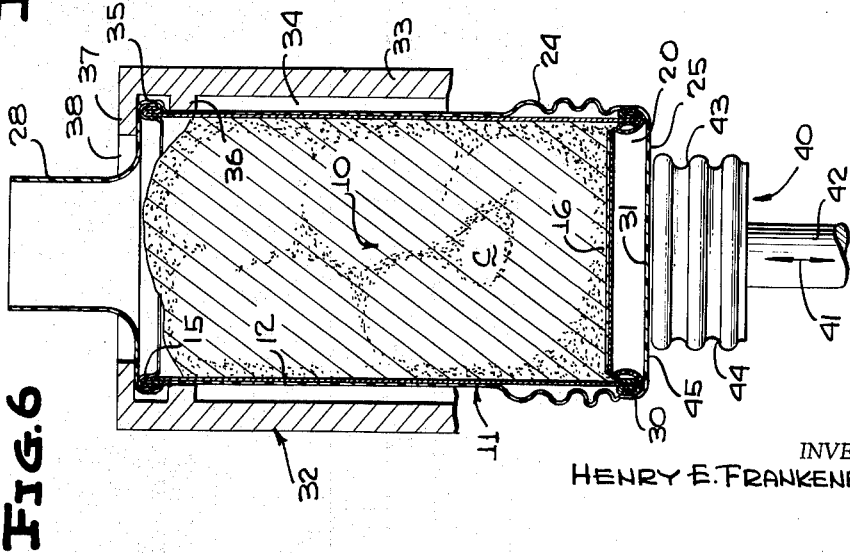
INVENTOR
HENRY E. FRANKENBERG

United States Patent Office 3,227,308
Patented Jan. 4, 1966

3,227,308
FOOD CONTAINER FOR USE IN SPACE SHIPS
Henry E. Frankenberg, Berwyn, Ill., assignor to Continental Can Company, Inc., New York, N.Y., a corporation of New York
Filed Nov. 6, 1962, Ser. No. 235,687
8 Claims. (Cl. 222—1)

This invention relates to a container for use in manned space ships, space-capsules, and other spacecraft, whether in sub-orbital, orbital or interplanetary flight.

An object of this invention is to provide a container having an extensible, contents-expelling tube or bag cooperative therewith, and specifically constructed to expel or dispense container-contents directly into the mouth of a space voyager while in flight.

Another object of this invention is to provide a novel container having a body and at least two removable ends, an expelling tube having a dispensing nipple at one end thereof, telescopically surrounding the exterior of the container body, and an end of the tube opposite the dispensing nipple being sealed and movable into the container through the end of the container opposite the dispensing nipple after the ends of the container have been removed whereby the contents of the container are expelled through the dispensing nipple.

Another object of this invention is to provide a novel container and an expelling tube of the character described, and additionally, to provide a novel protective element secured to the end of the container through which the sealed end of the expelling tube is movable to prevent the rupture of the expelling tube when the contents of the container are being dispensed.

Still another object of this invention is the provision of a novel storage area formed from a container and an associated extensible expelling tube of the character described whereby the removed ends of the container and the protective element may be stored after the contents of the container have been dispensed.

A further object of this invention is to provide a novel ejector including a bellows-type pressure plate cooperable with a container and an extensible expelling tube of the character described for efficiently dispensing an optimum quantity of the contents from within the container.

Another object of this invention is to provide a novel method of dispensing the contents of a container while in space, the container having at least two ends thereof removed, and the container being enclosed by an extensible expelling tube including a dispensing nipple for dispensing the contents of the container directly into the mouth of a space voyager.

Another object of this invention is to provide a novel method of dispensing the contents from a container while in space, the container having at least two ends thereof removed and being completely enclosed by an extensible expelling tube telescoped over the container, and additionally, to subsequently provide a storage area by sealing the dispensing nipple to completely enclose the container and the removed ends thereby forming an airtight storage area and preclude contamination of the space vehicle.

With the above, and other objects in view that will hereinafter appear, the nature of the invention will be more clearly understood by reference to the following detailed description, the appended claims and the several views illustrated in the accompanying drawings:

FIGURE 6 is a fragmentary, vertical sectional view of the container and the sealed extensible tube illustrated in FIGURE 5, and shows the container and the extensible tube housed in an ejector and a bellows-type pressure plate thereof positioned below the lower sealed end of the extensible tube prior to the movement of the pressure plate into the container.

FIGURE 7 is a fragmentary vertical sectional view of the components illustrated in FIGURE 6, and shows the bellows-type pressure plate in a radially expanded and axially compressed condition when fully inserted within the container, and additionally, shows the relationship between the severed edge of the lower end of the container, the protector sleeve and the extensible tube.

FIGURE 8 is a vertical sectional view of the container, the ends of the container, the protector sleeve and the extensible tube illustrated in FIGURE 7, and shows the relationship of the aforementioned components after the contents of the container have been dispensed, the container and the extensible tube have been removed from the ejector, and the extensible tube has been completely sealed.

With the advent of manned flights into space, containers which have heretofore been designed for dispensing contents under atmospheric conditions have proved to be inefficient under simulated and actual space flight conditions. The absence of gravity, with its inherent effect of weightlessness, and the present limitations in the size of spacecraft requires containers specifically designed for use in space.

Any such container must be of a relatively compact size, contamination-proof, capable of being easily manipulated and sufficiently inexpensive to be discarded after a single use.

A container constructed with the above-mentioned objects and limitations in mind is illustrated in FIGURES 1 through 8 of the drawings.

Figure 1:
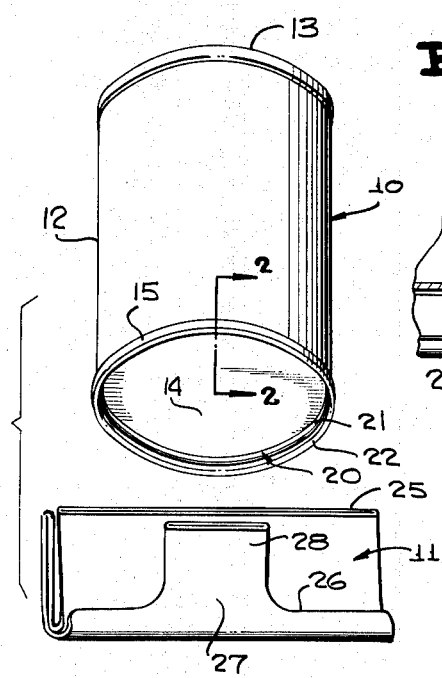
FIGURE 1 is an exploded view in bottom perspective, and shows a container and a folded extensible tube or bag prior to the attachment of the same to the container.
Figure 2:
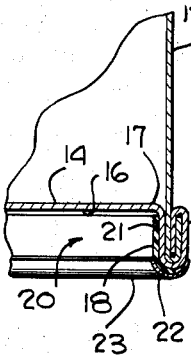
FIGURE 2 is an enlarged fragmentary sectional view taken along line 2—2 of FIGURE 1, and illustrates a piece of tape securing a protector sleeve to a bottom recessed end of the container.

A container 10 and an extensible tube or bag 11 is illustrated in FIGURE 1 of the drawings. The container 10 includes a cylindrical tubular body 12, an upper end 13 and an identical lower end 14. The ends 13 and 14 of the container 10 are secured to the body 12 by double seams 15, as is best illustrated in FIGURE 2. Each of the ends 13 and 14 includes a recessed end wall 16 integrally joined by an annular radius 17 to a chuck wall 18 of the double seam 15. The body 12 and the ends 13 and 14 may be constructed from tinplate, aluminum or like lightweight sheet metal.

A removable protector sleeve 20 is nested in the lower recessed end 14 of the body 12, as is best illustrated in FIGURE 2. The sleeve 20 includes a peripheral wall 21 and an integral curl 22. The protector sleeve 20 is preferably constructed of plastic, but may be made of metal, and is dimensioned to snap-fit within the lower recessed end 14. A piece of tape 23, such as pressure sensitive "Scotch" tape, circumferentially overlaps the curl 22 of the protector sleeve 20 and the seam 15 of the body 12 to adhesively secure the protector sleeve 20 within the lower recessed end 14. The piece of tape 23 and the protector sleeve 20 are removable for purposes to be hereinafter described.

The extensible expelling tube 11 includes a cylindrical body 24, an open bottom end 25 and an upper annular shoulder portion 26. A tapered end portion 27 is integrally joined to the annular shoulder portion 26 and terminates in an open, pliable, dispensing spout or nipple 28. The extensible expelling tube 11 is preferably constructed of a thin flexible plastic material and is stored in its folded form of FIGURE 1, in a chamber of a spacecraft, or is suitably secured within the recessed upper end 13 or lower end 14 of the container 10 in a manner not shown.

A preferred method of dispensing contents C from within the container 10 is sequentially illustrated in FIGURES 3 through 7 of the drawings.

As is best illustrated in FIGURE 2, the piece of tape 23 and the protector sleeve 20 are removed from within the recessed lower end 14 of the container 10. The extensible expelling tube 11 is removed from the upper recessed end 13, the lower recessed end 14 or from a chamber in the spacecraft, depending on where the folded extensible expelling tube 11 was originally stored. If desired, the contents C may be heated by heating the container 10.

Figure 3:
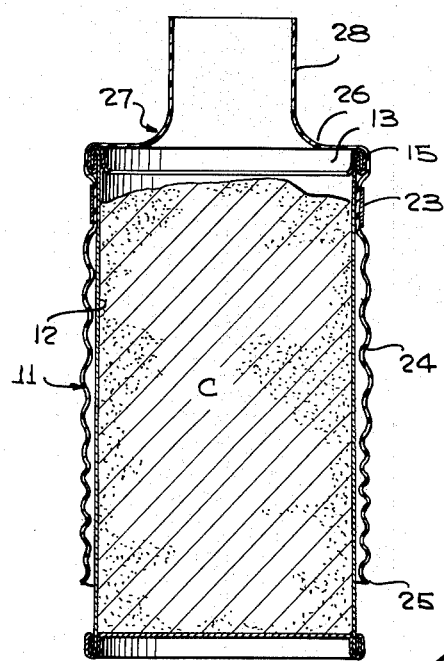
FIGURE 3 is a vertical sectional view of the container illustrated in FIGURE 1, and shows an opening formed by the removal of an upper end of the container and an unfolded extensible tube surrounding and secured to the container by a piece of tape.

As is best illustrated in FIGURE 3, an end wall of the container 10, such as the end wall 16 of the upper recessed end 13, is severed by suitable means, such as a can opener, and removed from within the recessed end 13. The extensible expelling tube 11 is unfolded and the open bottom end 25 thereof is telescoped downwardly along the exterior of the container body 12. The annular shoulder portion 26 of the expelling tube 11 seats upon the double seam 15 of the body 12 and accurately aligns the pliable dispensing spout 28 axially of the body 12. The piece of tape 23, which had been heretofore removed from the position illustrated in FIGURE 2, is applied to the expelling tube 11 adjacent the upper end 13 to secure the expelling tube 11 thereto.

Figure 4:
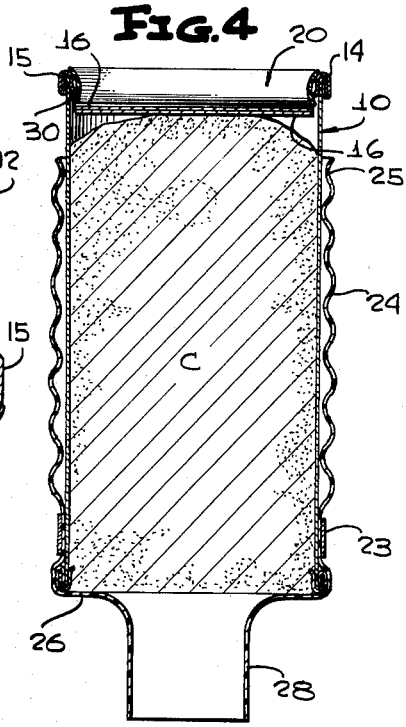
FIGURE 4 is an inverted vertical sectional view of the container and the extensible tube illustrated in FIGURE 3, and shows two removed ends of the container seated upon the contents within the container and a protector sleeve overlapping a severed edge of the lower end of the container.

Referring to FIGURE 4, the container 10 is inverted and the end wall 16 of the lower recessed end 14 is severed therefrom. Since the container 10 is opened in space, the absence of gravity precludes the contents C from "falling down" through the nipple 28, and requires that the severed end wall 16 of the lower recessed end 14 be manually "placed" upon the contents C. The heretofore removed end wall 16 of the recessed upper end 13 is then placed upon and in abutment with the end wall 16 of the lower recessed end 14. The resilient protector sleeve 20 is then snapped upon the seam 15 of the lower recessed end 14, and overlies a severed peripheral edge 30 of the recessed bottom end 14, for a purpose to hereinafter be described.

Figure 5:
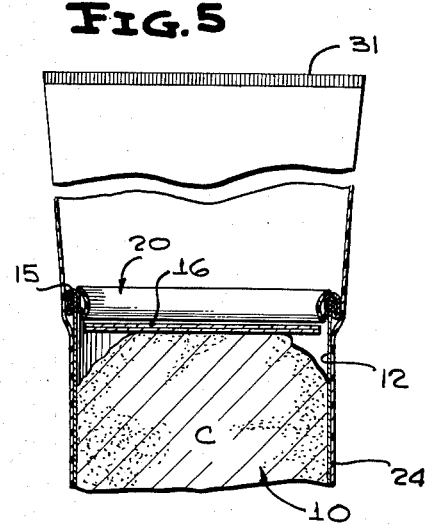
FIGURE 5 is a fragmentary, vertical sectional view with a part broken away and shown in side elevation, of a lower portion of the inverted container and the inverted extensible tube illustrated in FIGURE 4, and shows a portion of the extensible tube conforming to the exterior of the container and a lower sealed end of the extensible tube.

While the container 10 is still in the inverted position illustrated in FIGURE 4, the extensible expelling tube 11 is drawn upwardly and the body 24 thereof conforms to the configuration of the body 12 of the container 10, as is best illustrated in FIGURE 5. The open bottom end 25 of the extensible expelling tube 11 is then heat sealed by a suitable heat sealing mechanism (not shown) to form the sealed edge 31.

The container 10 is then again inverted to the original upright position shown in FIGURE 3, and inserted within an ejector 32, as is shown in FIGURE 6. The ejector 32 includes a cylindrical tubular housing 33 having a central bore 34 and an upper annular channel 35. An inwardly directed annular flange 36 separates the central bore 34 from the upper annular channel 35. The cylindrical tubular housing 33 includes an inwardly directed annular top flange 37 apertured at 38 to provide an area of access through which the dispensing nipple 28 may protrude. The annular flanges 36 and 37, as well as the central bore 34 and the upper annular channel 35, are dimensioned to captively secure the container 10 within the ejector 32, as is clearly shown in FIGURE 6. The housing 33 may, for example, be hinged for pivoting along its axis, thereby providing two half-housings (not shown), which may be pivotally opened, rejoined and secured in a suitable manner to clampingly secure the container 10 therein.

The ejector 32 includes a plunger 40 which is reciprocal within the housing 33 for movement into and out of the body 12 in the directions indicated by the arrow 41. The plunger 40 includes a shaft 42 having a bellows-type pressure plate 43 secured to an upper end thereof. The bellows-type pressure plate 43 is of a generally circular cross-sectional configuration, and as is best illustrated in FIGURE 6, has a diameter which is appreciably less than the diameter of the interior of the container body 12. However, as the bellows-type pressure plate advances into the interior of the body 12, the resisting pressure of the contents C to the advance of the bellows pressure plate 43 causes individual bellows 44 thereof to radially expand and axially compress and thereby conform to the internal diameter of the body 12. The radial expansion of the bellows pressure plate 43 is best illustrated in FIGURE 7.

Referring once again to FIGURE 6, to dispense the contents C from within the body 12, one merely grasps the ejector 32 with one hand, and with the dispensing nipple 28 placed in the user's mouth, the shaft 42 is manually advanced into the body 12. An upper surface 45 of the bellows-type pressure plate abuts the sealed bottom end of the extensible expelling tube 11 and draws the same into the body 12. The protector sleeve 20 overlying the severed edge 30 prevents the extensible expelling tube 11 from being torn or ruptured by the severed edge 30. Continued advancement of the bellows pressure plate 43 brings the sealed bottom end 25 into abutment with the end walls 16, 16. It is again noted that the end walls 16, 16 cannot "fall down" from the position illustrated in FIGURE 6 due to the absence of gravity. Further advancement of the bellows pressure plate 43 causes the contents C to be dispensed or expelled through the dispensing nipple 28, and the resisting pressure of the contents C to the advance of the bellows pressure plate 43 causes the same to radically expand and axially compress as heretofore noted.

As is best illustrated in FIGURE 7, because of the radial expansion of the bellows pressure plate 43, an optimum quantity of the contents C is dispensed from within the container 10. Also, because the protector sleeve 20 overlies the severed edge 30 and prevents contact between the edge 30 and the extensible expelling tube 11, the extensible expelling tube can be drawn substantially the entire internal length of the body 12 without rupture. As the bellows-type pressure plate 43 retracts from the position illustrated in FIGURE 7, the same returns to its normal diameter (shown in FIGURE 6) and can therefore be more readily removed from the interior of the body 12. Irrespective of whether the bellows-type pressure plate 43 is moving into or out of the body 12, the closed heat sealed bottom end 31 of the extensible expelling tube 11 precludes contact between the surface 45 thereof and the contents C of the container 10.

The container 10 is then removed from the ejector 32 and any left over contents C within the pliable expelling nipple 28 may be removed therefrom by manually squeezing the expelling nipple 28. As is best illustrated in FIGURE 8, the expelling nipple 28 is cleaned, a liquid chemical bacteria retardant (not shown) is placed into the body 12 of the container 10, and the expelling nipple 28 is heat sealed along an edge 39 thereof. The nipple 28 may also be sealed by turning the same outside-in prior to sealing the edge 39. The expelling nipple 28 is manually inserted into the body 12 as is clearly illustrated in FIGURE 8, and the extensible expelling tube 11 completely encloses the container 10, the ends walls 16, 16, the protector sleeve 20 and any remaining contents C. Thus, the extensible expelling tube 11 and the container 10 cooperate to form an air-tight storage area whereby contamination of the spacecraft is avoided.

While an example of a container and an associated extensible expelling tube is disclosed herein, it is to be understood that the changes in the disclosed structures, as well as their use, may be made without departing from the spirit and scope of the invention as defined in the appended claims.

I claim:

1. A container particularly adapted for use in manned spacecraft comprising a container body having opposite open ends, an extensible flexible tube externally overlying said container body, said extensible tube being closed at one end thereof, said closed end of the tube being adapted for extension into said body through a first of said ends whereby contents within said body can be expelled through an end of said extensible tube adjacent the other of said ends.

2. A container particularly adapted for use in manned spacecraft comprising a container body having opposite open ends, an extensible flexible tube externally overlying said container body, said extensible tube being closed at one end thereof and being provided with a nipple at an end opposite said closed end of the tube, said closed end of the tube being adapted for extension into said body through a first of said opposite open ends whereby contents within said body can be expelled through said nipple.

3. A container particularly adapted for use in manned spacecraft comprising a container body with open ends, said container body having opposite peripheral end portions, an extensible flexible tube externally overlying said container body, said extensible tube being closed at one end thereof, a protector sleeve overlying the peripheral end portion of said container body adjacent the closed end of the extensible tube and said closed end of the tube being adapted for extension into said body in overlying relationship to said protector sleeve whereby rupture of said extensible tube is precluded upon extension of the same into said body.

4. The method of assembling a closed container, a protector sleeve and a flexible extensible tube to dispense or expel contents from within the container comprising the steps of opening said container at two ends thereof, securing said extensible tube externally of and adjacent the first open end of the container, securing said protector sleeve to the second open end of the container, sealing said extensible tube adjacent said second open end of the container and inserting said extensible tube through said second open end of the container in overlying relationship to said protector sleeve to preclude rupture of said extensible tube and allow expulsion of the container contents.

5. The method of assembling a closed container having at least first and second ends, a protector sleeve and a flexible extensible tube to dispense or expel contents from within the container comprising the steps of severing and removing portions of both said ends from said container, placing said removed end portions into the first end of said container, securing said protector sleeve to said container at said first end, securing said extensible tube in overlying relation to said container at said second end sealing said extensible tube adjacent said first end and inserting said sealed extensible tube through said first open end in overlying relationship to said protector sleeve and in abutment with one of said removed container end portions whereupon extension of said extensible tube into said first end causes expulsion of the container-contents through said second end and the extensible tube.

6. The combination of a housing and an open ended container confined within said housing, said container including a body and an exteriorly overlying extensible flexible tube secured thereto, said extensible tube being closed at one end thereof, a plunger reciprocally mounted for axial movement toward the closed end of the extensible tube and into said container body through one of the open ends thereof whereby the closed end of the extensible tube is movable into the container body to expel the contents therefrom through the other open end of the container body, opposite the end entered by the plunger.

7. The combination as defined in claim 6 wherein a bellows-type pressure plate is secured to said plunger.

8. The combination as defined in claim 7 wherein said bellows-type pressure plate includes a plurality of individual annular bellows which radially expand and axially compress and thereby conform the bellows-type pressure plate to the internal diameter of the container body whereby an optimum quantity of container-contents is expelled from the container.

References Cited by the Examiner

UNITED STATES PATENTS

| 1,848,652 | 3/1932 | Pence. | |
|---|---|---|---|
| 1,866,145 | 7/1932 | Wilson | 29—473.3 |
| 2,661,126 | 12/1953 | Spencer | 222—386 |
| 2,679,281 | 5/1954 | Paulucci | 99—171 |
| 2,684,791 | 7/1954 | Sebell | 222—386 |
| 2,924,877 | 2/1960 | Creutz | 29—473.3 |
| 2,941,699 | 6/1960 | Schmidt et al. | 222—386.5 |

FOREIGN PATENTS 781,103  8/1957  Great Britain.

M. HENSON WOOD, JR., *Primary Examiner.*

LOUIS J. DEMBO, *Examiner.*